United States Patent [19]
Schmidt

[11] Patent Number: 4,536,674
[45] Date of Patent: Aug. 20, 1985

[54] PIEZOELECTRIC WIND GENERATOR

[76] Inventor: V. Hugo Schmidt, 1221 S. Cedarview Dr., Bozeman, Mont. 59715

[21] Appl. No.: 623,104

[22] Filed: Jun. 22, 1984

[51] Int. Cl.³ .......................................... H01L 41/08
[52] U.S. Cl. ................... 310/330; 310/332; 310/339; 310/800
[58] Field of Search ................ 310/330–332, 310/339, 800, 321, 323; 73/DIG. 4, 754, 861.18, 861.19, 861.21, 861.22, 861.23, 861.24; 322/2 R

[56] References Cited

U.S. PATENT DOCUMENTS

| | | | |
|---|---|---|---|
| 3,457,463 | 7/1969 | Balamuth | 310/339 X |
| 4,005,319 | 1/1977 | Nilsson et al. | 310/339 |
| 4,387,318 | 6/1983 | Kolm et al. | 310/331 X |
| 4,396,852 | 8/1983 | Hunt | 310/339 X |
| 4,404,490 | 9/1983 | Taylor et al. | 310/339 |
| 4,413,202 | 11/1983 | Krempl et al. | 310/800 X |
| 4,467,236 | 8/1984 | Kolm et al. | 310/331 X |

FOREIGN PATENT DOCUMENTS 3017986 11/1981 Fed. Rep. of Germany ...... 310/800

OTHER PUBLICATIONS

Piezoceramic Devices, by D. Ruby, *Popular Science*, Jul. 1982, pp. 69–71.

*Primary Examiner*—Mark O. Budd
*Attorney, Agent, or Firm*—Richard C. Conover

[57] ABSTRACT

An electric power generator used a piezoelectric transducer mounted on a resilient blade which in turn is mounted on an independently flexible support member. Fluid flow against the blade causes bending stresses in the piezoelectric polymer which produces electric power.

5 Claims, 4 Drawing Figures

PIEZOELECTRIC WIND GENERATOR

BACKGROUND OF INVENTION

This invention relates to a device for converting the mechanical energy of wind into electrical energy using piezoelectric materials.

Piezoelectric materials have long been used to convert electrical energy into mechanical energy. Their use to convert mechanical energy into electrical energy has been generally limited to stress transducers such as strain gauges. The use of such materials in converting mechanical energy to electrical power has not been generally known. However, there are a few patents describing such uses of piezoelectric materials such as U.S. Pat. No. 3,350,853 to Schiavone which discloses the use of a piezoelectric crystal in generating electrical power; U.S. Pat. No. 1,884,547 to Bower which shows an electrical system where a piezoelectric element is subjected to torsional movement to generate an electrical power output; U.S. Pat. No. 4,100,630 to Hendel which describes a wave powered electric generator using piezoelectric elements; U.S. Pat. No. 4,317,047 to de Almada which describes another wave power electric generator; and U.S. Pat. No. 3,239,678 to Kolm et al. which describes a piezoelectric power system for use in conjunction with an exhaust system of a jet engine. The Kolm et al. patent describes piezoelectric material mounted inside an exhaust pipe of a jet engine and describes a piezoelectric system mounted outside the exhaust pipe. Acoustical energy generated by the jet engine causes piezoelectric members to vibrate and in doing so to generate electrical power.

The development of piezoelectric polymers in recent years has made it easier to electromechanically couple such materials to fluid movement of water and air, for example. Piezoelectric fans employing a piezoelectric polymer (polyvinylidene fluoride abbreviated as $PVF_2$) have been developed which convert electrical energy to motion of air. This application is described in an article entitled "High Field Dielectric Loss of $PVF_2$ and the Electromechanical Conversion Efficiency of a $PVF_2$ Fan" by Toda in Ferroelectrics (1979), volume 22, pages 919–923.

Furthermore, U.S. Pat. No. 4,404,490 to Taylor et al. shows an apparatus for generating electrical power from waves near the surface of bodies of water. The apparatus described by Taylor et al. uses piezoelectric polymers.

Further, in April, 1982, the inventor of the present invention described a windmill electric generator in which the blades were constructed with a $PVF_2$ bimorph. A bimorph is comprised of two $PVF_2$ sheets placed back to back. This fan included a rotor using a bimorph blade which rotated in the wind. Stressing the bimorph blade caused electrical power to be generated. This piezoelectric polymer electric generator was described in a publication reporting the "Proceedings of the 1982 Wind and Solar Energy Technology Conference" and sponsored by the University of Missouri at Columbia, Mo.

SUMMARY OF INVENTION

The present invention is an improvement on the piezoelectric polymer wind generator devices now known in the art.

The present invention includes a two-element structure employing a piezoelectric polymer bimorph as its electromechanical conversion element. The flexure of the piezoelectric bimorph provides an alternating current electrical output. The design of the two-element structure is such that it will oscillate both under steady or variable fluid flow conditions.

The two-element structure includes a cantilever mounted resilient support member mounted to a base at one end and having a resilient blade member having a pair of wings mounted to the support at the other end thereof. The pair of wings are preferably mounted with one wing on either side of the support. In a normal operating position the wings are positioned flat against and perpendicular to the direction of fluid flow in an extended position. In a preferred embodiment this device is used to generate power from wind. As the wind blows, the support and wings oscillate in a cycle which can be described in four steps. In the first step, the support is flexing downwind while the wings are nearly fully extended, presenting maximum area to the wind and therefore capable of absorbing maximum energy from the wind. In the second step, the support attains its maximum downwind displacement but the wings are bending downwind into a "C" shape from the combined effects of inertia and higher relative wind velocity. In the third step, the support is flexing upwind while the wings have attained their greatest amount of downwind bending, thereby presenting minimum area to the wind and hence dissipating less energy during the support's upwind motion than was gained during its downwind motion. In the fourth step, the support attains its maximum upwind displacement while the wings are straightening out from the combined effects of inertia and lower relative wind velocity. Kinematically described, the support and wings both exhibit oscillatory bending, with the phase of the support motion leading that of the wing motion by approximately 90°. This oscillatory bending of the wings is used to bend the piezoelectric polymer in an oscillatory manner, since the piezoelectric polymer is mounted on the wings and is subject to the flexure of the wings.

In a preferred embodiment the piezoelectric bimorph is mounted to the wings. However, it is contemplated that the piezoelectric bimorph may be mounted to the support with beneficial results.

BRIEF DESCRIPTION OF THE DRAWINGS

In order that the invention can be clearly understood and readily carried into effect a preferred embodiment will now be described, by way of example only, with reference to the accompanying drawings wherein.

DESCRIPTION OF A PREFERRED EMBODIMENT

Figure 1:
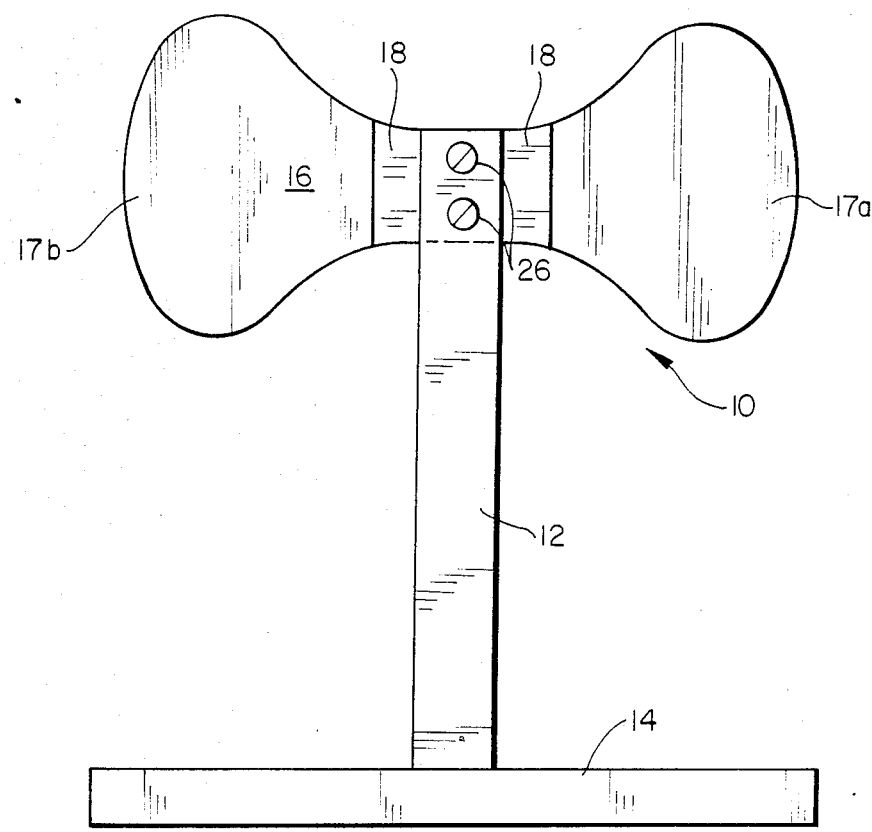
FIG. 1 is an elevational view of a wind generator device constructed in accordance with the present invention.
Figure 2:
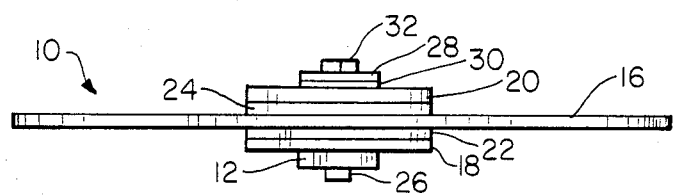
FIG. 2 is a top view of the device as shown in FIG. 1.
Figure 3:
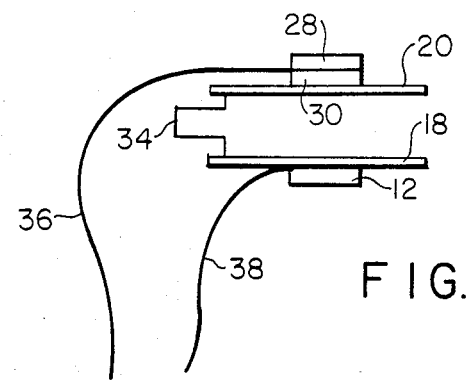
FIG. 3 is a schematic view showing the electrical connections of the various components used in the preferred embodiment.

The piezoelectric polymer wind generator 10 is shown in FIGS. 1 through 3. This generator 10 includes an elongate support 12 constructed of a resilient material such as spring steel and is mounted to a base 14 in a cantilever fashion. A blade 16 is mounted to the end of the flexible support 12 at the end of the support 12 opposite to that mounted to the base 14. The blade 16 has mounted thereto a piezoelectric polymer bimorph consisting of two piezoelectric polymer sheets 18 and 20 each of which are secured to the blade 16 with a double sided adhesive tape 22 and 24, respectively, as shown in FIG. 2. A bolt 26, which is electrically non-conductive, extends through the piezoelectric polymer sheets 18 and 20 and also the adhesive tape 22 and 24 as shown in FIG. 2. Opposite the head of the bolt 26 are mounted two washers 28 and 30 as shown in FIG. 2 and a nut 32 is threaded on the bolt 26 to secure the washers to the bolt 26. The washers 28 and 30 are used in making an electrical connection with the outer surface of the piezoelectric polymer sheet 20 as will be subsequently described.

The outer surfaces of piezoelectric polymer sheets 18 and 20 have a metallic coating which is electrically conductive. These coated sheets are available on the market and there is nothing new about these sheets. The piezoelectric polymer sheets 18 and 20 are connected back to back and the inner surfaces of the piezoelectric polymer sheets 18 and 20 are connected together with a wire or other conductive means 34. A lead 36 which includes a bare portion for placement between the washers 28 and 30, is provided as one of two power leads. A lead 38 is electrically connected to the outer surface of polymer sheet 18 as shown in FIG. 3 and is used as the other power lead. During operation of wind generator 10 an alternating electrical potential appears between the two leads 36 and 38.

The generator 10 is used by positioning the blade 16 such that the blade faces the wind and is generally perpendicular to the direction of the wind. The blade 16 can be of any shape; however, in a preferred embodiment the shape of the blade 16 is as shown in FIG. 1 which comprises a shape corresponding to a cross-section of a "dumbbell" along a major axis thereof.

In a preferred embodiment the flexible support 12 is constructed of a wide blade material so as to impede twisting of the blade 12 about the longitudinal axis of the elongate flexible support 12.

The blade 16, in a preferred embodiment, has wing portions 17a and 17b. The wind sets the system consisting of flexible support 12 and blade 16 into an oscillation cycle described below. When the flexible support is bending downwind, the wing portion 17a and 17b of the blade 16 are nearly straight. Since during this portion of the cycle the wings present their maximum area to the wind force, maximum energy is absorbed from the wind during this movement. The wing portions 17a and 17b of the blade 16 continue to bend downwind while the flexible support 12 is beginning its upwind motion, so that during this upwind motion very little area of blade 16 is presented to the wind. Then, as the flexible support 12 begins to resume its downwind motion, the wings 17a and 17b are again straightening out so that they present maximum surface area to the wind when the flexible support 12 is moving downwind. Thus this two-element structure oscillates back and forth in the wind. This device oscillates when the wind is steady and also when the wind is variable.

The piezoelectric polymer sheets 18 and 20 are mounted in a preferred embodiment one on each side of the blade 16. In this manner flexure of the blade 16 causes stress in the piezoelectric polymer sheets 18 and 20—one sheet being stressed in tension and the other in compression at a given instant in the flexure cycle. Because the polarity of the voltage in a given sheet reverses as the stress changes from compression to tension, it is necessary to attach the sheets 18 and 20 to the blade 16 in a back-to-back configuration so that their voltages during the flexure cycle will add and not cancel. This configuration of the piezoelectric polymer sheets is known as a "bimorph". By stressing the piezoelectric polymer sheets 18 and 20 electrical power is generated. The leads 36 and 38 being connected to the outer surfaces of this bimorph draw off the electrical power generated and transmit the power to a location away from the device.

It is contemplated that generators as described in this application can be connected in parallel for increased power output. It is also contemplated that these generators can be synchronized to an electrical power line or can be connected to a battery or capacitor through a semiconductor diode. If these generators are synchronized to an electrical powerline, they can be connected in series by an inductor to resonate the capacitive reactance of the blades thereby reducing the overall source impedance and increasing the current fed into the line.

While all of the fundamental features of the invention have been shown and described, it should be understood that various substitutions, modifications and variations may be made by those skilled in the art without departing from the spirit or scope of the invention. Accordingly, all such modifications and variations are included within the scope of the invention as defined by the following claims.

I claim:

1. An improved electrical power generating apparatus utilizing a piezoelectric material for converting mechanical energy of fluid flow to electrical energy comprising:
    an elongate resilient support member;
    the support member being mounted to a base;
    a resilient blade member having a surface of maximum extent positioned generally facing the direction of fluid flow and mounted to the support member in spaced apart relation from the base;
    the blade member and support member being adapted to flex independently when the blade member is subjected to force of the fluid flow; and
    a piezoelectric element being mounted to the blade member which element flexes when the blade flexes.

2. The generating apparatus according to claim 1 wherein the support member is adapted to resist axial rotational movement about the longitudinal axis of the support member.

3. The generating apparatus according to claim 1 wherein the resilient blade member presents a surface to the fluid flow which has a shape corresponding to a cross-section of a "dumbbell" along a major axis thereof and wherein the blade member is symmetrically mounted to the support member with corresponding portions positioned on either side of the support member.

4. The generating apparatus according to claim 1 wherein the piezoelectric element comprises a bimorph.

5. An improved electrical power generating apparatus utilizing a piezoelectric material for converting mechanical energy of fluid flow to electrical energy comprising:
    an elongate resilient support member;
    the support member being mounted to a base;
    a resilient blade member having a surface of maximum extent positioned generally facing the direction of fluid flow and mounted to the support member in spaced apart relation from the base;
the blade member and support member being adapted to flex independently when the blade member is subjected to force of the fluid flow; and
a piezoelectric element being mounted to the support member which element flexes when the support is subjected to flexing by the force of the fluid flow acting on the blade.

* * * * *